United States Patent
Aoki et al.

(10) Patent No.: US 9,507,436 B2
(45) Date of Patent: Nov. 29, 2016

(54) STORAGE MEDIUM HAVING STORED THEREON INFORMATION PROCESSING PROGRAM, INFORMATION PROCESSING SYSTEM, INFORMATION PROCESSING APPARATUS, AND INFORMATION PROCESSING EXECUTION METHOD

(71) Applicant: NINTENDO CO., LTD., Kyoto (JP)

(72) Inventors: Ryoma Aoki, Kyoto (JP); Munetaka Tsuda, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 546 days.

(21) Appl. No.: 13/958,866

(22) Filed: Aug. 5, 2013

(65) Prior Publication Data
US 2014/0306888 A1 Oct. 16, 2014

(30) Foreign Application Priority Data
Apr. 12, 2013 (JP) .................................. 2013-084144

(51) Int. Cl.
| | |
|---|---|
| G06F 3/00 | (2006.01) |
| G06F 3/033 | (2013.01) |
| G06F 3/01 | (2006.01) |
| G06F 3/0485 | (2013.01) |
| G06F 3/0346 | (2013.01) |

(52) U.S. Cl.
CPC .............. G06F 3/033 (2013.01); G06F 3/005 (2013.01); G06F 3/017 (2013.01); G06F 3/0346 (2013.01); G06F 3/0485 (2013.01)

(58) Field of Classification Search
None
See application file for complete search history.

(56) References Cited

U.S. PATENT DOCUMENTS 6,611,141 B1  8/2003 Schulz et al.
2005/0212754 A1* 9/2005 Marvit .................. G06F 1/1626
                                                              345/156
2006/0169021 A1* 8/2006 Silverstein ............. G01C 21/16
                                                              73/1.37

(Continued)

FOREIGN PATENT DOCUMENTS

| EP | 1 839 714 | 10/2007 |
| EP | 1 961 465 | 8/2008 |
| JP | 2007-61489 | 3/2007 |

OTHER PUBLICATIONS

U.S. Appl. No. 14/073,251, filed Nov. 6, 2013.

(Continued)

*Primary Examiner* — Kent Chang
*Assistant Examiner* — Benjamin Morales Fernandez
(74) *Attorney, Agent, or Firm* — Nixon & Vanderhye PC

(57) ABSTRACT

An exemplary information processing apparatus performs predetermined information processing in accordance with an attitude of an input member having an imaging device and an attitude sensor. The information processing apparatus calculates a first position according to the attitude of the input member by using imaging information based on an image including a predetermined imaging target captured by the imaging device. Further, the information processing apparatus calculates a second position according to the attitude of the input member, which position is on a predetermined straight line or a predetermined plane, by using a result of detection of the attitude sensor. When the first position is calculable, the predetermined information processing is performed by using a control position based on at least the first position. When the first position is incalculable, the predetermined information processing is performed by using a control position based on at least the second position.

15 Claims, 9 Drawing Sheets

(56) References Cited

U.S. PATENT DOCUMENTS

| | | | |
|---|---|---|---|
| 2007/0060228 A1* | 3/2007 | Akasaka | A63F 13/10 463/1 |
| 2008/0068336 A1 | 3/2008 | Choi et al. | |
| 2008/0285805 A1 | 11/2008 | Luinge et al. | |
| 2011/0086708 A1 | 4/2011 | Zalewski et al. | |
| 2013/0064427 A1 | 3/2013 | Picard et al. | |
| 2013/0181892 A1 | 7/2013 | Liimatainen et al. | |
| 2014/0062881 A1* | 3/2014 | Solomon | G09G 5/006 345/158 |

OTHER PUBLICATIONS

Extended European Search Report dated Mar. 20, 2015 issued in European Application No. 13178484.5 (6 pgs.).

U.S. Patent and Trademark Office, "Non-Final Office Action," issued in connection with U.S. Appl. No. 14/073,251, dated Aug. 25, 2015 (26 pages).

Yamada, Final Office Action dated Jan. 8, 2016 issued in co-pending U.S. Appl. No. 14/073,251, filed Nov. 6, 2013 (7 pages).

* cited by examiner

F I G. 4
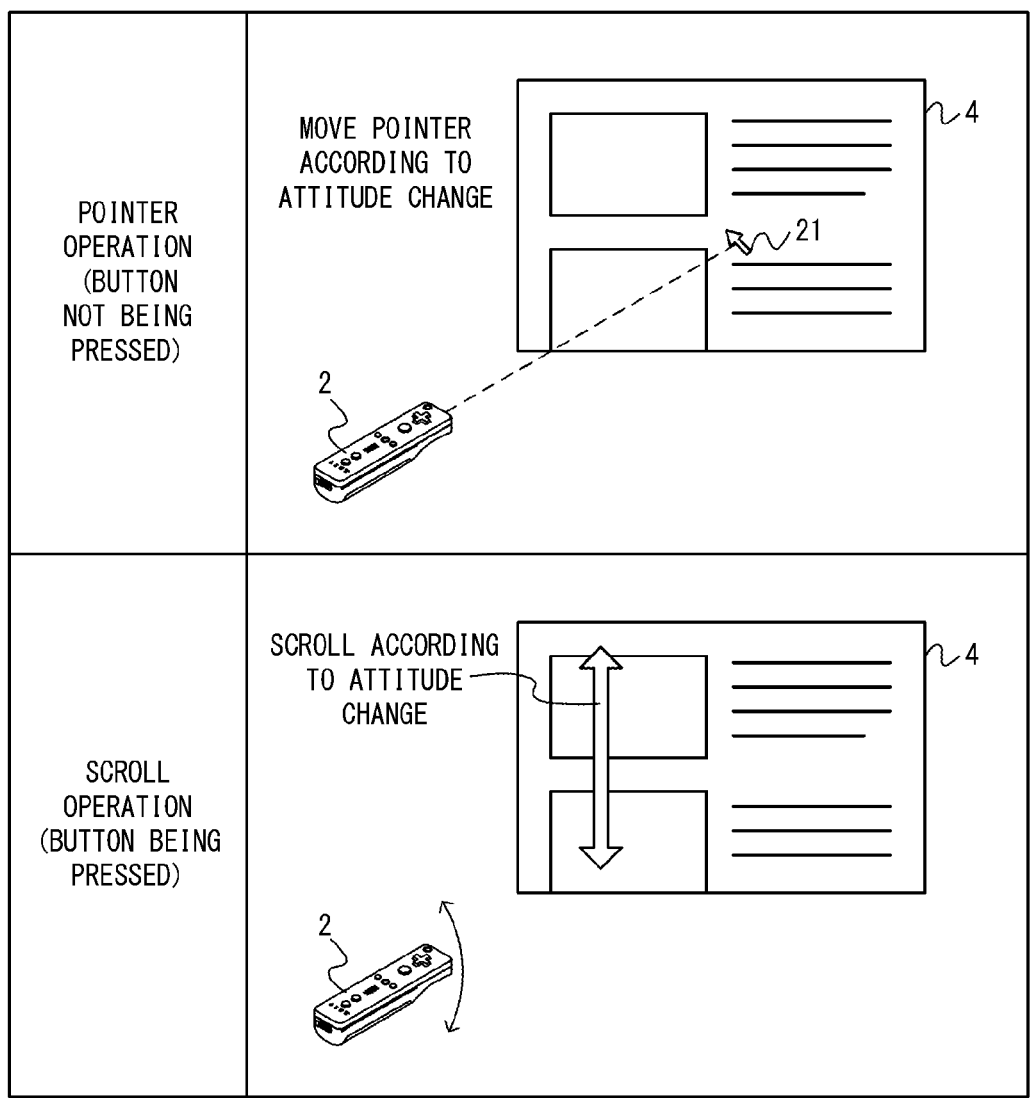

F I G. 5
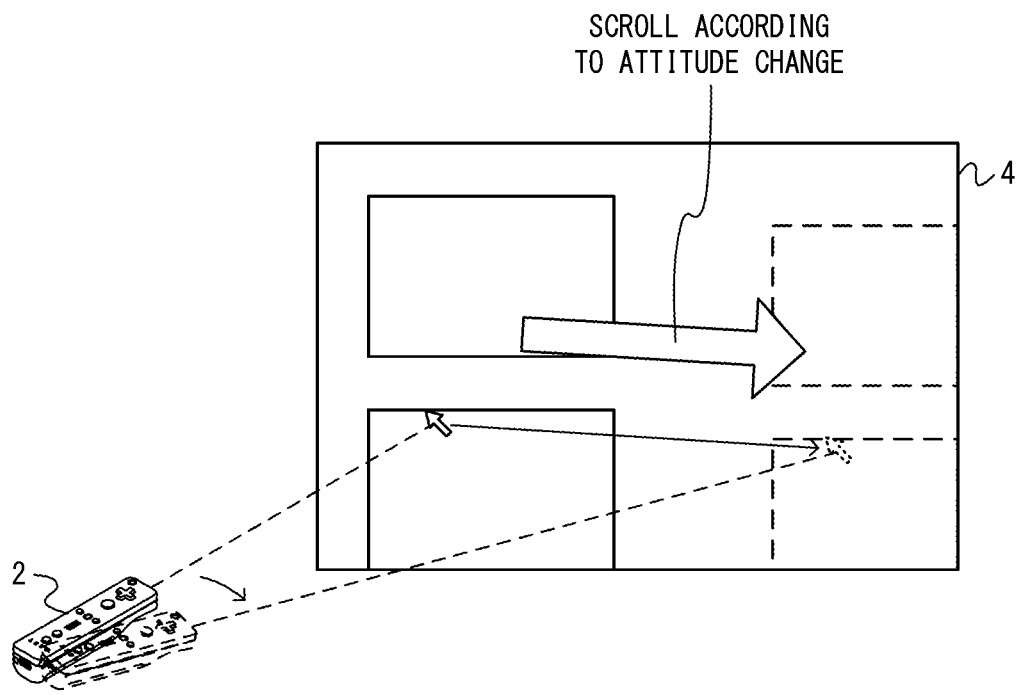

STORAGE MEDIUM HAVING STORED THEREON INFORMATION PROCESSING PROGRAM, INFORMATION PROCESSING SYSTEM, INFORMATION PROCESSING APPARATUS, AND INFORMATION PROCESSING EXECUTION METHOD

CROSS REFERENCE TO RELATED APPLICATION

The disclosure of Japanese Patent Application No. 2013-84144, filed on Apr. 12, 2013 is incorporated herein by reference.

FIELD

The technique shown here relates to an storage medium having stored thereon an information processing program, an information processing system, an information processing apparatus, and an information processing execution method, which are used for performing information processing in accordance with an attitude of an input member (input device).

BACKGROUND AND SUMMARY

Conventionally, there has been an information processing system in which an input is performed by an operation of moving an input device. For example, in a conventional game system, a controller held by a user is provided with a camera, and an image of a marker arranged in the vicinity of a monitor such as a television is captured by the camera. The game system calculates a two-dimensional vector based on the image captured by the camera, and moves an operation target displayed on the monitor based on the two-dimensional vector.

In the method of capturing an image of a marker with a camera, however, a user can move the input device only in a range where the marker is included in the imaging range (field-of-view range) of the camera, and thus the range where the user can move the input device is limited.

Therefore, the present application discloses a storage medium having stored thereon an information processing program, an information processing system, an information processing apparatus, and an information processing execution method, which enable a user to perform an input operation by freely moving an input member.

(1) An example of an information processing apparatus described in the present specification performs predetermined information processing in accordance with an attitude of an input member having an imaging device and an attitude sensor. The information processing apparatus includes a first position calculation section, a second position calculation section, and a processing execution section. The first position calculation section calculates a first position according to the attitude of the input member, which position is on a predetermined straight line or a predetermined plane, by using imaging information based on an image including a predetermined imaging target captured by the imaging device. The second position calculation section calculates a second position according to the attitude of the input member, which position is on a predetermined straight line or a predetermined plane, by using a result of detection of the attitude sensor. When the first position is calculable, the processing execution section performs a scroll process of scrolling an image displayed on the display device, by using a control position based on at least the first position. When the first position is incalculable, the processing execution section performs the scroll process by using a control position based on at least the second position.

The above "input member" may be an input device separated from the information processing apparatus, or may be integrated with the information processing apparatus.

(2) After the scroll process has been started, the processing execution section may start the scroll process by using the control position based on the second position, when the state where the first position is calculable has switched to the state where the first position is incalculable.

(3) The processing execution section may perform, as the scroll process, a process of moving a target image displayed on the display device in accordance with the attitude of the input member. When the state where the first position is calculable has switched to the state where the first position is incalculable, the processing execution section may continue the movement of the target image by using the control position based on the second position.

The above "target image" may be the entirety of an image displayed on the screen of the display device, or an image displayed on a part of the screen. That is, the process of moving the target image may be a process of scrolling the screen, or a process of moving an image of an object displayed on the screen.

(4) When the state where the first position is calculable has switched to the state where the first position is incalculable, the processing execution section may perform the scroll process by using a control position based on the first position before the switching and the second position after the switching.

(5) When the state where the first position is calculable has switched to the state where the first position is incalculable, the processing execution section may specify a correction process for correcting the second position so that the values of the first position and the second position immediately before the switching are equal to each other, and may perform the scroll process by using a control position obtained by performing the correction process on the second position after the switching.

(6) When the state where the first position is calculable has switched to the state where the first position is incalculable, the processing execution section may calculate a difference value by subtracting the second position immediately before the switching from the first position immediately before the switching, and may perform the scroll process by using a control position obtained by adding the difference value to the second position after the switching.

(7) The imaging information for calculating the first position used for calculation of the difference value, and the detection result of the attitude sensor, for calculating the second position used for calculation of the difference value, may be obtained at the same timing by the information processing apparatus.

(8) After the switching from the state where the first position is calculable to the state where the first position is incalculable, if further switching to the state where the first position is calculable has occurred, the processing execution section may perform the scroll process by using a control position which is obtained by correcting the first position by using a value obtained by performing the correction process on the second position immediately after the switching to the state where the first position is calculable.

(9) The information processing apparatus may further include a first pointer processing section. The first pointer processing section displays a pointer image at a position corresponding to the first position, if further switching to the state where the first position is calculable has occurred after the switching from the state where the first position is calculable to the state where the first position is incalculable.

(10) The information processing apparatus may further include a second pointer processing section. The second pointer processing section displays a pointer image at a position corresponding to the control position, if further switching to the state where the first position is calculable has occurred after the switching from the state where the first position is calculable to the state where the first position is incalculable.

(11) The scroll process may be a process of scrolling an image displayed on the display device.

(12) The information processing apparatus may further include a third pointer processing section. The third pointer processing section displays a pointer image for designating a selectable object displayed on the display device, at a position corresponding to the control position, when the scroll process is not performed.

(13) The processing execution section may perform the scroll process while a predetermined condition is satisfied, and may set the amount of correction by the correction process to 0 at the time of starting the scroll process.

(14) Further, the present specification discloses an example of an information processing apparatus which controls an image displayed on a display device, in accordance with an attitude of an input member having an imaging device and an attitude sensor. The information processing apparatus includes a first movement control section, and a second movement control section. The first movement control section configured to move a target image displayed on the display device, in accordance with the attitude of the input member, by using imaging information based on an image including a predetermined imaging target captured by the imaging device. The second movement control section configured to continue the movement of the target image in accordance with the attitude of the input member, by using a result of detection of the attitude sensor, when the predetermined imaging target is outside an imaging range of the imaging device due to a change of the attitude of the input member.

(15) Another example of an information processing apparatus described in the present specification performs predetermined information processing in accordance with an attitude of an input member having an imaging device and an attitude sensor. The information processing apparatus includes a first obtainment section, a second obtainment section, and a processing execution section. The first obtainment section obtains imaging information based on an image including a predetermined imaging target captured by the imaging device. The second obtainment section obtains a result of detection of the attitude sensor. At the time of starting the predetermined information processing, if execution of the information processing based on the image captured by the imaging device is possible, the processing execution section performs the information processing by using the imaging information. When the state where execution of the information processing based on the image captured by the imaging device is possible has switched to the state where execution of such information processing is not possible, the processing execution section performs the information processing with the information to be used being switched from the imaging information to the detection result of the attitude sensor.

(16) When the state where execution of the information processing based on the image captured by the imaging device is not possible has switched to the state where execution of such information processing is possible, the processing execution section may perform the predetermined information processing by using the detection result of the attitude sensor, obtained immediately after the switching, and the imaging information obtained after the switching.

(17) Further, the present specification discloses an example of an information processing apparatus as follows. The information processing apparatus may perform predetermined information processing in accordance with an attitude of an input member having an imaging device and an attitude sensor. The information processing apparatus may include an imaging information obtainment section, an angular velocity information obtainment section, and a processing execution section.

The imaging information obtainment section obtains imaging information based on an image including a predetermined imaging target captured by the imaging device. The angular velocity information obtainment section obtains angular velocity information indicating an angular velocity of the input member as a result of detection of the attitude sensor (e.g., gyro sensor).

When execution of the information processing based on the image captured by the imaging device is possible, the processing execution section performs the predetermined information processing in accordance with a change of the position of the predetermined imaging target in the captured image. Further, when execution of the information processing based on the image captured by the imaging device is not possible, the processing execution section performs the predetermined information processing in accordance with a change indicated by the angular velocity represented by the angular velocity information, instead of the change of the position of the predetermined imaging target in the captured image.

It is noted that the present specification discloses an information processing system capable of performing the same processes as those of the respective components of the information processing apparatuses in the above (1) to (17), and discloses a computer-readable storage medium which causes a computer to perform the same processes as those of the respective components. Furthermore, the present specification discloses an information processing execution method performed in the above (1) to (17).

These and other objects, features, aspects and advantages of the exemplary embodiment will become more apparent from the following detailed description when taken in conjunction with the accompanying drawings.

BRIEF DESCRIPTION OF THE DRAWINGS

FIG. 4 is a diagram showing an example of a display control operation performed by using the input device;

FIG. 5 is a diagram showing an example of a manner in which an image is scrolled by a scroll operation using the input device;

DETAILED DESCRIPTION OF NON-LIMITING EXAMPLE EMBODIMENTS

[1. Configuration of Information Processing System]

Figure 1:
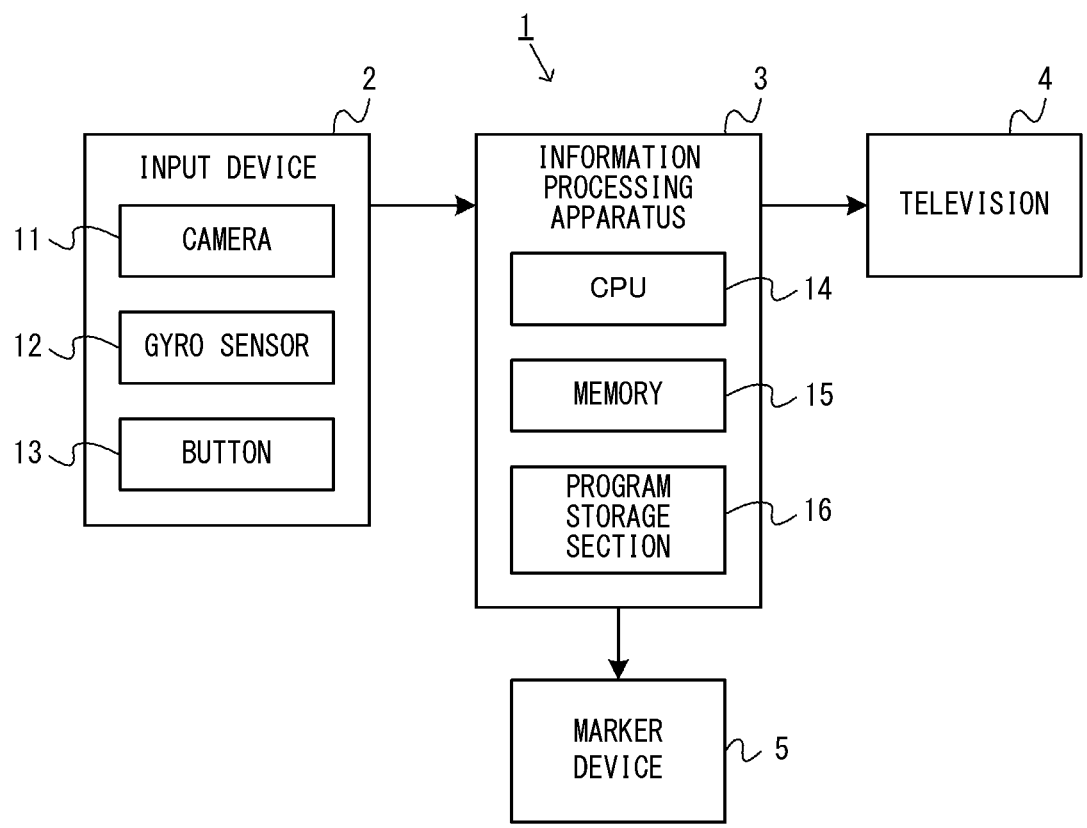
FIG. 1 is a block diagram showing an example of a non-limiting information processing system according to an embodiment.

Hereinafter, an information processing program, an information processing system, an information processing apparatus, and an information processing execution method according to an example of an embodiment will be described. FIG. 1 is a block diagram showing an example of the information processing system according to the present embodiment. In FIG. 1, the information processing system 1 includes an input device 2, an information processing apparatus 3, a television 4, and a marker device 5. The information processing system 1 according to the present embodiment controls an image displayed on the television 4 in accordance with the attitude of the input device 2.

The information processing system 1 includes the input device (controller) 2. In the present embodiment, the input device 2 includes a camera 11, a gyro sensor 12, and a button 13.

The camera 11 is an example of imaging means (imaging device). In the present embodiment, the camera 11 is capable of detecting infrared light emitted from the marker device 5 described later. Although details will be described later, when an image of the marker device 5 is captured by the camera 11, the position and/or the attitude of the input device 2 with respect to the marker device 5 can be estimated by using a result of the image-capturing.

The gyro sensor 12 is an example of an attitude sensor, and detects angular velocities of the input device 2. In the present embodiment, the gyro sensor 12 detects angular velocities around predetermined three axes. However, in another embodiment, the gyro sensor may detect an angular velocity around one axis or angular velocities around two axes. The input device 2 may optionally include, as an attitude sensor, a sensor whose detection result enables calculation (estimation) of the attitude of the input device 2. For example, in another example, the input device 2 may include, in addition to (or instead of) the gyro sensor 12, an acceleration sensor and/or a magnetic sensor.

The input device 2 detects an operation performed by a user, and transmits operation data representing the user's operation to the information processing apparatus 3. In the present embodiment, the operation data includes: imaging information obtained from the image captured by the camera 11; angular velocity information obtained by the gyro sensor 12; and depression information relating to the button 13. The imaging information is information relating to a captured image. In the present embodiment, the imaging information is information indicating the position of the marker device 5 on the plane of the captured image. When the marker device 5 is not included in the captured image, the imaging information indicates that the marker device 5 is not included in the captured image. In the present embodiment, the imaging information is generated from the captured image by a processing section included in the input device 2. In another embodiment, data of the captured image itself may be included in the operation data as the imaging information. The angular velocity information indicates the angular velocities detected by the gyro sensor 12. The depression information indicates whether the button 13 is pressed.

The information processing system 1 includes the information processing apparatus 3. The information processing apparatus 3 performs information processing (display control process described later) to be performed in the information processing system 1. The information processing apparatus 3 may be an information processing apparatus in any form such as a personal computer, a game apparatus, a handheld terminal, a smart phone, or the like. The information processing apparatus 3 is able to communicate with the input device 2 and the television 4. It is noted that the communication between the information processing apparatus 3 and the input device 2 or the television 4 may be performed via a wire or wirelessly.

As shown in FIG. 1, the information processing apparatus 3 includes a CPU 14, a memory 15, and a program storage section 16. The CPU 14 performs the above-mentioned information processing by executing a predetermined information processing program by using the memory 15. Although details will be described later, the information processing in the present embodiment is a display control process of generating an image based on the operation data, and causing the television 4 to display the generated image. It is noted that the information processing apparatus 3 may be of any structure that can execute the information processing. For example, a part or all of the information processing may be executed by a dedicated circuit. In the present embodiment, the information processing apparatus 3 generates an image by performing the information processing, and the generated image is output from the information processing apparatus 3 to the television 4.

The program storage section 16 stores therein the information processing program. The program storage section 16 is any storage device to which the CPU 14 is accessible. The program storage section 16 may be a storage section included in the information processing apparatus 3, such as a hard disk, or may be a storage section attachable to and detachable from the information processing apparatus 3, such as an optical disc.

The television 4 is an example of a display device for displaying an image. When an image is transmitted from the information processing apparatus 3 to the television 4, the television 4 displays this image.

The marker device 5 functions as an imaging target for the camera 11. For example, the marker device 5 is installed on the periphery of the television 4 (refer to FIG. 2). In the present embodiment, the marker device 5 includes one or more light emitting elements (e.g., LED) each emitting infrared light. In the present embodiment, the marker device 5 is connected to the information processing apparatus 3, and light emission of each light emitting element is controlled by the information processing apparatus 3.

In the information processing system 1, the information processing apparatus 3 performs the information processing in accordance with an input performed on the input device 2, and an image obtained as a result of the information processing is displayed on the television 4. As described above, in the present embodiment, the information processing system 1 is configured such that an input function, an information processing function, and a display function are realized by a plurality of apparatuses. In another embodiment, a plurality of functions among these functions may be realized by a single information processing apparatus. For example, the information processing system 1 may include a single information processing apparatus (e.g., a handheld information processing terminal or the like) having an input function and an information processing function, instead of the input device 2 and the information processing apparatus 3, respectively.

Further, in another embodiment, the function of the information processing apparatus 3 may be realized by a plurality of apparatuses. For example, in another embodiment, at least a part of the information processing performed by the information processing apparatus 3 may be distributed to and performed by a plurality of apparatuses that are able to perform communication via a network (a wide-area network and/or a local network).

[2. Display Control Process in Information Processing System 1]

Next, the display control process performed in the information processing system 1 will be described. It is noted that an exemplary case will be described below, in which a browser application that enables a user to browse a web page or the like is executed in the information processing apparatus 3, and the user performs, by using the input device 2, an operation of moving a pointer, or scrolling the displayed web page.

(2-1: Outline of Operation Using Input Device)

Figure 2:
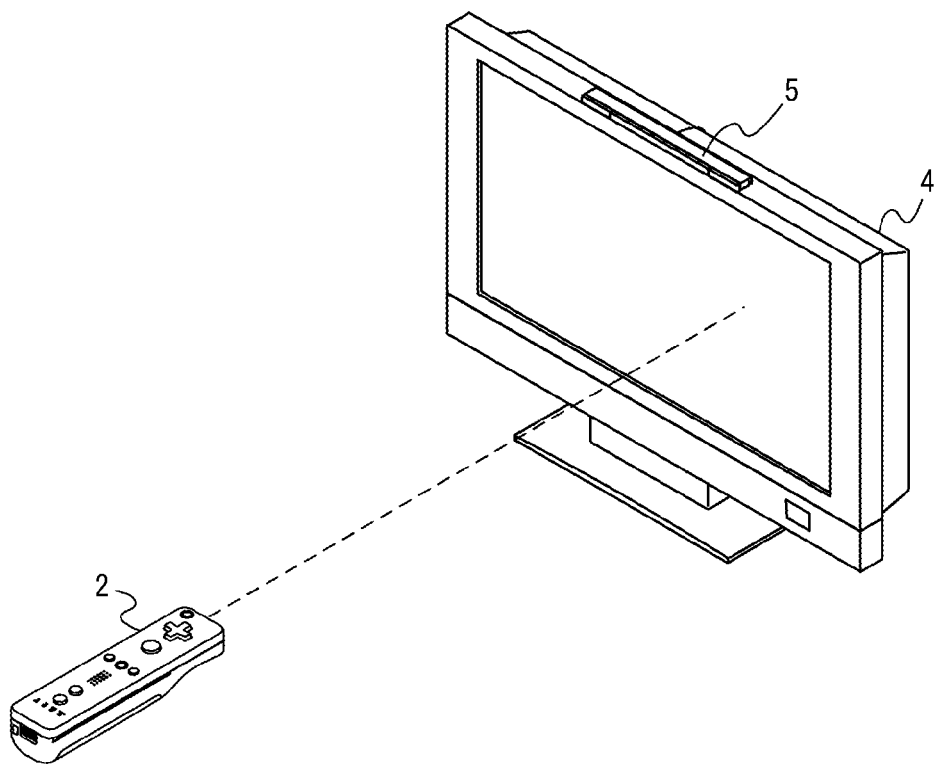
FIG. 2 is a diagram showing an example of an arrangement of a television and a marker device in a case where an exemplary input device is used.

FIG. 2 is a diagram showing an example of arrangement of the television 4 and the marker device 5 in a case where the input device 2 is used. As shown in FIG. 2, in the present embodiment, a user installs the marker device 5 on the periphery of the television 4 (in FIG. 2, on the television 4), and uses the input device 2 with the imaging direction of the camera 11 basically facing the television 4 (marker device 5). The user in the above-mentioned state changes the attitude of the input device 2 to perform various operations. However, the input device 2 need not always be used in the state where it faces the television 4, and may be used in the state where it faces a direction off the television 4 (refer to "(2-4: Calculation of control coordinates)" described later).

(2-2: Calculation of Camera Coordinates, Gyro Coordinates, and Control Coordinates)

Next, a description will be given of coordinate values (camera coordinates, gyro coordinates, and control coordinates) which are calculated from the operation data of the input device 2, and used as inputs in the display control process. In the present embodiment, the information processing system 1 calculates, from the operation data, coordinate values in accordance with the attitude of the input device 2, and performs, using the calculated coordinate values as inputs, the display control process of controlling an image displayed on the television 4. It is noted that each coordinate value indicates a position on a plane corresponding to the screen of the television 4 (refer to FIG. 3). That is, the information processing system 1 calculates a position according to the attitude of the input device 2 on the plane.

The information processing system 1 calculates the coordinate values according to the attitude of the input device 2, based on the output information (the above-mentioned imaging information) from the camera 11 and on the output information (the above-mentioned angular velocity information) from the gyro sensor 12. Hereinafter, the coordinates calculated based on the imaging information obtained from the camera 11 are referred to as "camera coordinates", and the coordinates calculated based on the angular velocity information obtained from the gyro sensor 12 are referred to as "gyro coordinates".

The camera coordinates are calculated based on the imaging information. As described above, the imaging information is information indicating the position of the marker device 5 on the plane of the captured image. Since the position indicated by the imaging information changes by changing the attitude of the input device 2, it is possible to calculate the camera coordinates according to the attitude of the input device 2, based on the imaging information. Although the method of calculating the camera coordinates from the imaging information is arbitrary, the camera coordinates can be calculated by a method disclosed in Japanese Laid-Open Patent Publication No. 2007-61489, for example. Alternatively, by previously obtaining the positional relation between the television 4 and the marker device 5, it is possible to calculate, as the camera coordinates, the coordinates of a pointing position of the input device 2, based on the imaging information. It is noted that the "pointing position of the input device 2" is a position (on the screen) pointed to by the input device 2, and it is a position of an intersection point between a straight line obtained by extending a predetermined axis of the input device 2 and the screen of the television 4.

The gyro coordinates are calculated based on the angular velocity information. Since the angular velocity information indicates the angular velocity of the input device 2, it is possible to calculate the gyro coordinates according to the attitude of the input device 2, based on the angular velocity information. The method of calculating the gyro coordinates from the angular velocity information is arbitrary. For example, a rotation angle of the input device 2 from a reference attitude is calculated based on the angular velocity of the input device 2, and the rotation angle is multiplexed by a predetermined constant to calculate the gyro coordinates. Alternatively, by previously obtaining the relation between a certain attitude of the input device 2 and the pointing position of the input device 2 at that time, it is possible to calculate, as the gyro coordinates, the coordinates of the pointing position of the input device 2, based on the angular velocity information.

Figure 3:
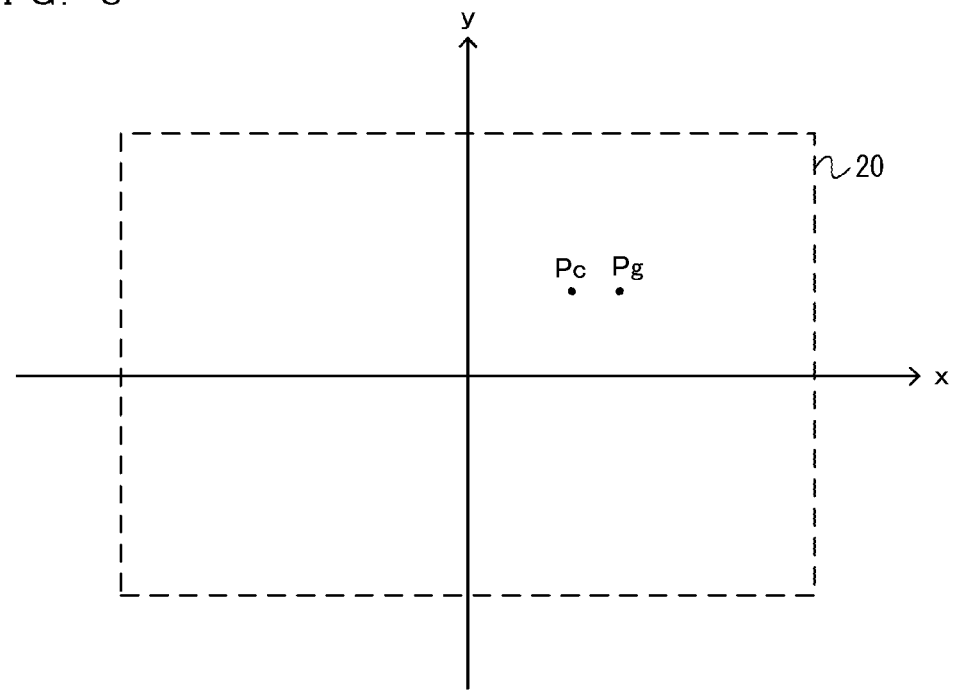
FIG. 3 is a diagram showing examples of camera coordinates and gyro coordinates on a plane.

FIG. 3 is a diagram showing examples of camera coordinates and gyro coordinates on a plane. As shown in FIG. 3, in the present embodiment, as a coordinate system representing positions on the plane, an xy coordinate system is set which has an origin at a position corresponding to the center of the screen. FIG. 3 shows camera coordinates Pc and gyro coordinates Pg in a case where the input device 2 takes a certain attitude. The camera coordinates Pc and the gyro coordinates Pg are calculated by different methods using different sensors. Therefore, as shown in FIG. 3, even with the same attitude of the input device 2, the camera coordinates Pc and the gyro coordinates Pg can take different values. It is noted that generally, the camera coordinates Pc indicate the pointing position with higher accuracy than the gyro coordinates Pg. However, both the gyro coordinates and the camera coordinates need not indicate the pointing position with high accuracy, and may be arbitrary values that change according to the attitude of the input device 2.

A dotted line area 20 shown in FIG. 3 is an area corresponding to the screen of the television 4 on a plane. In FIG. 3, the camera coordinates Pc and the gyro coordinates Pg each indicate a position within the area 20, but may indicate a position outside the area 20 (i.e., outside the screen). That is, since the gyro sensor 12 is able to calculate the attitude of the input device 2 regardless of the positional relation between the input device 2 and the television 4, the information processing system 1 can calculate the gyro coordinates indicating a position outside the screen. In addition, basically, the camera coordinates can be calculated when the camera coordinates are within the area 20 (i.e., when the camera 11 faces the television 4). However, camera coordinates indicating a position outside the area 20 can be calculated as long as the marker device 5 is included in the imaging range of the camera 11.

As described above, in the present embodiment, as the coordinates according to the attitude of the input device 2, two kinds of coordinates, i.e., the camera coordinates and the gyro coordinates, are calculated. In addition, the information processing system 1 calculates, as the coordinates used for the above-mentioned display control process, control coordinates obtained by combining the camera coordinates and the gyro coordinates. That is, the information processing system 1 calculates the control coordinates based on the camera coordinates and the gyro coordinates. A method of calculating the control coordinates will be described later (refer to "(2-4: Calculation of control coordinates)" described later).

(2-3: Content of Display Control Operation)

Next, the display control operation performed using the input device 2 will be described. FIG. 4 is a diagram showing an example of the display control operation performed using the input device 2. As shown in FIG. 4, in the present embodiment, a user can perform an operation of moving the pointer 21 (pointer operation) and an operation of scrolling an image (scroll operation) as the display control operation using the input device 2.

In the present embodiment, when a predetermined button of the input device 2 is not pressed, the user can perform the pointer operation. That is, when the predetermined button of the input device 2 is not pressed, the information processing system 1 determines the position of the pointer 21 displayed on the screen of the television 4, based on the control coordinates. Specifically, the information processing system 1 displays the pointer 21 at the position on the screen indicated by the control coordinates. Accordingly, the pointer 21 moves in accordance with a change of the attitude of the input device 2. It is noted that when a selectable object included in a web page displayed on the screen is selected by using the pointer 21, the information processing system 1 may perform a process corresponding to the selected object.

On the other hand, when the predetermined button of the input device 2 is pressed, the user can perform the scroll operation. That is, when the predetermined button of the input device 2 is pressed, the information processing system 1 determines the position of a display area, in the web page, to be displayed on the screen of the television 4, based on the control coordinates.

FIG. 5 is a diagram showing an example of a manner in which an image is scrolled by the scroll operation using the input device 2. It is noted that in the present embodiment, a pointer is displayed even during the scroll operation. In FIG. 5, a pointer is displayed at the position of the control coordinates. During the scroll operation of the present embodiment, the position of the control coordinates at the time of starting the scroll operation is used as a reference position, and the information processing system 1 moves the web page in accordance with the movement direction and movement amount of the control coordinates from the reference position. Accordingly, the web page displayed on the screen scrolls in accordance with a change of the attitude of the input device 2. Specifically, as shown in FIG. 5, the web page moves in the same direction as the movement direction of the control coordinates by the same amount as the movement amount of the control coordinates. Accordingly, in the present embodiment, the user can scroll the web page by using the input device 2, with an operation feeling as if he/she performs a drag operation using a mouse.

It is noted that the specific method of scrolling the image based on the control coordinates is arbitrary. For example, in another embodiment, the information processing system 1 may scroll the web page at a speed corresponding to the movement amount of the control coordinates, in the same direction as the movement direction of the control coordinates from the reference position.

In the present embodiment, the scroll operation can be performed not only when the input device 2 faces the television 4 (marker device 5) but also when the input device 2 does not face the television 4. In the state where the input device 2 does not face the television 4 and the camera 11 does not capture an image of the marker device 5, no camera coordinates are calculated. In the present embodiment, however, since the gyro coordinates can be calculated even in such a state, the control coordinates according to the attitude of the input device 2 can be calculated by using the gyro coordinates (refer to "(2-4: Calculation of control coordinates)" described later). Accordingly, in the above-mentioned state, the information processing system 1 can perform the scroll process by using the control coordinates based on the gyro coordinates.

As described above, in the present embodiment, it is possible to perform the scroll operation by greatly changing the attitude of the input device 2, as compared to the case where the scroll operation is performed by using only the camera coordinates. For example, a user starts the scroll operation by pressing the predetermined button with the input device 2 facing the screen of the television 4, and points the input device 2 with the predetermined button being pressed to a direction off the screen, and thus the user can largely scroll the image of the web page.

(2-4: Calculation of Control Coordinates)

Figure 6:
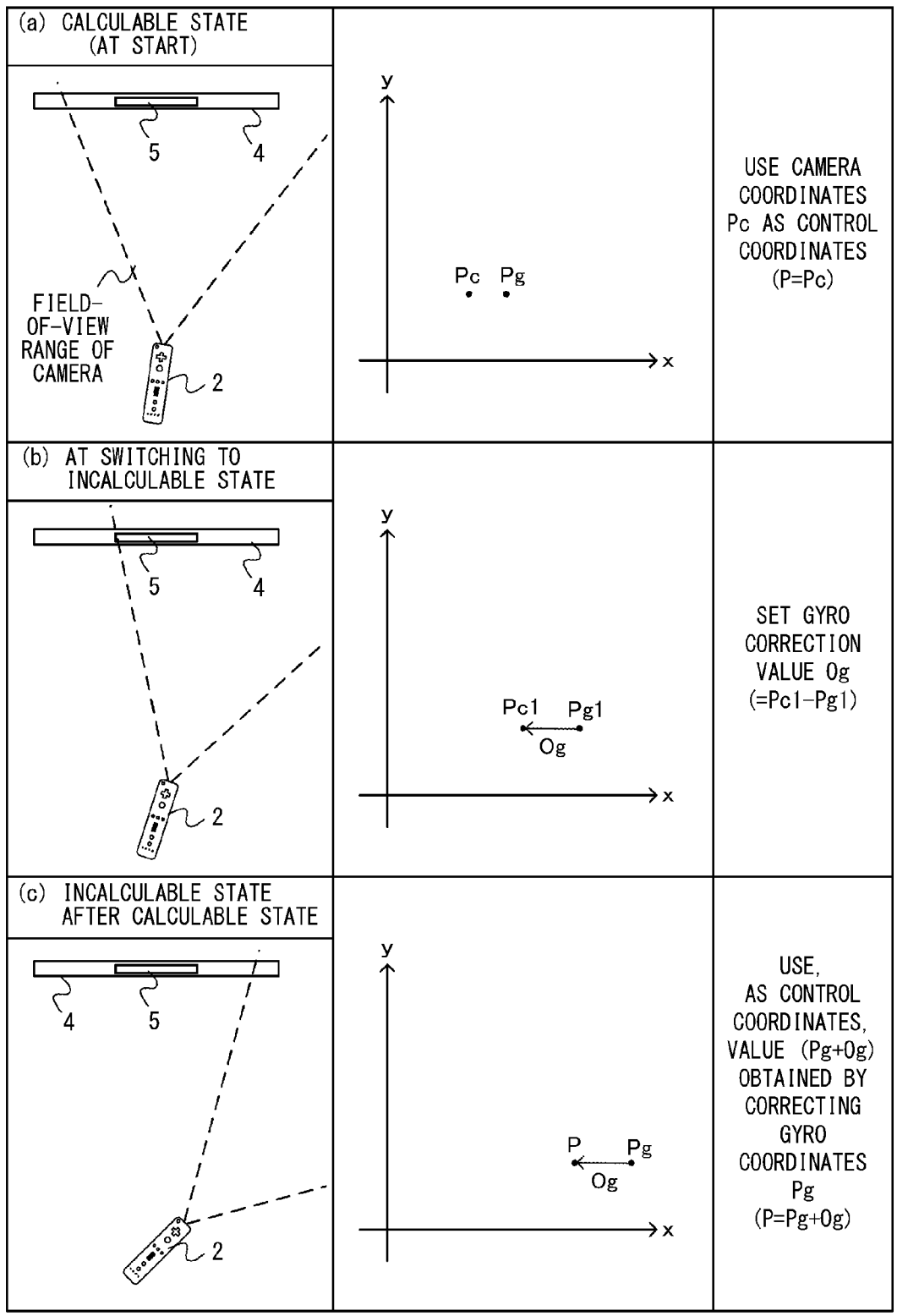
FIG. 6 is a diagram showing an example of a control coordinate calculation method.
Figure 7:
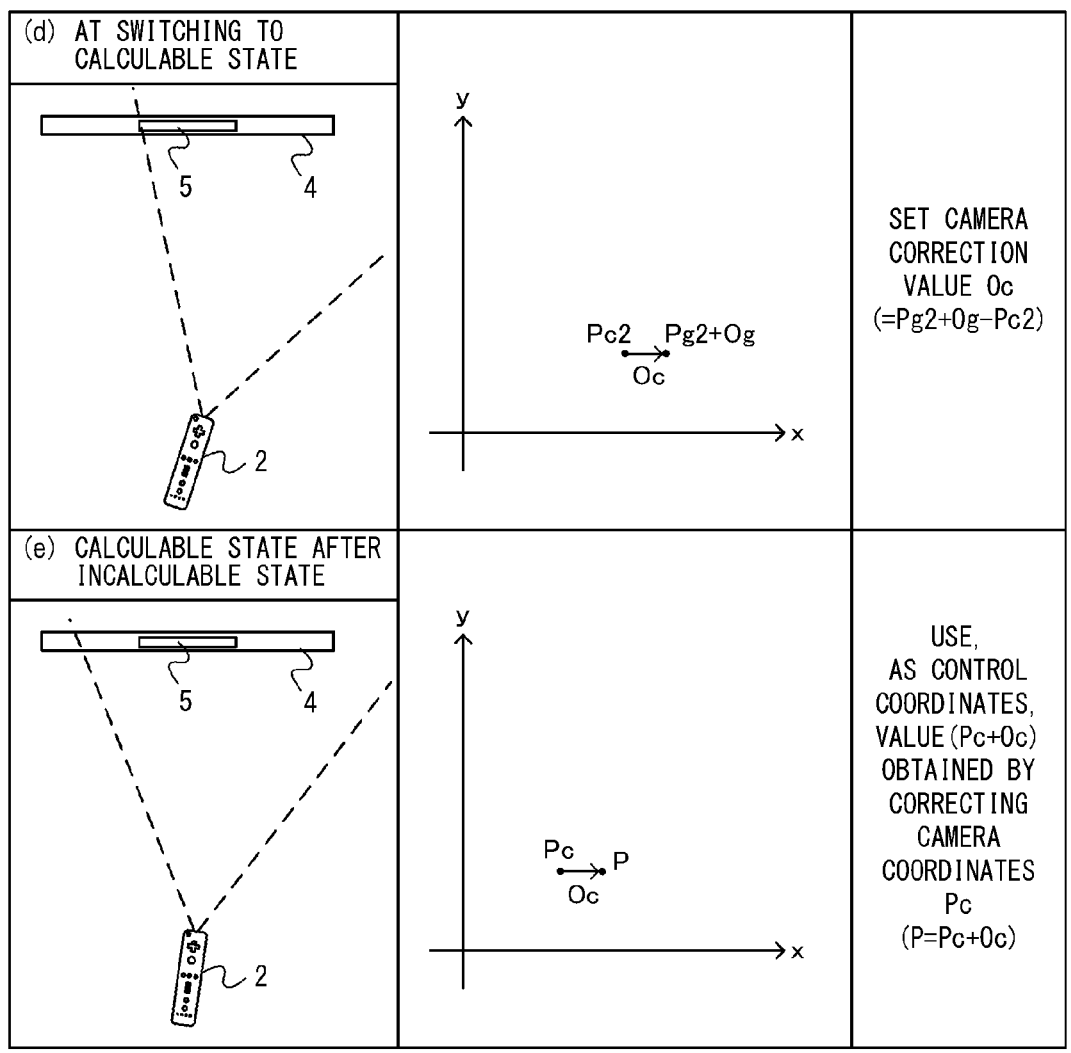
FIG. 7 is a diagram showing an example of a control coordinate calculation method.

Next, a control coordinate calculation method using the camera coordinates and the gyro coordinates will be described in detail. FIGS. 6 and 7 show an example of the control coordinate calculation method. Hereinafter, with reference to FIGS. 6 and 7, an exemplary case will be described in which the scroll operation is started in a state where camera coordinates are calculable (hereinafter referred to as "calculable state"), and then the state switches to a state where the camera coordinates are incalculable (hereinafter referred to as "incalculable state"), and thereafter, the state returns to the calculable state.

It is noted that the calculable state is a state where an image of the marker device 5 is captured by the camera 11 to an extent that camera coordinates can be calculated (in other words, execution of the information processing based on the captured image is possible). The incalculable state is a state where an image of the marker device 5 is not sufficiently captured due to some causes, and therefore camera coordinates are not calculated. The incalculable state may be caused by, for example, that the marker device 5 is not within the field-of-view range of the camera 11 as shown in FIGS. 6 and 7, that an obstacle is present between the camera 11 and the marker device 5, that only a part of the marker device 5 is captured and therefore camera coordinates cannot be calculated (when camera coordinates can be calculated even if only a part of the marker device 5 is captured, this situation is regarded as the "calculable state"), or the like.

If the information processing system 1 is in the calculable state (state (a) in FIG. 6) when the scroll operation is started, the information processing system 1 uses the camera coordinates Pc directly as control coordinates P. At this time, the gyro coordinates Pg are not used for calculation of the control coordinates P. This is because the camera coordinates Pc are considered to be higher in accuracy than the gyro coordinates Pg, as the coordinates indicating the pointing position of the input device 2. It is noted that in the present embodiment, the information processing system 1 repeatedly calculates the camera coordinates Pc and the gyro coordinates Pg by using the operation data repeatedly transmitted from the input device 2, and repeatedly calculates the control coordinates by using the camera coordinates Pc and/or the gyro coordinates Pg.

After the state (a), if the attitude of the input device 2 changes and the calculable state switches to the incalculable state (state (b) in FIG. 6), the information processing system 1 sets a gyro correction value Og. The gyro correction value Og is a correction value used for correcting the gyro coordinates Pg when the control coordinates are calculated based on the gyro coordinates Pg in the incalculable state. In the present embodiment, the gyro correction value Og is calculated according to equation (1):

$$Og = Pc1 - Pg1 \tag{1}$$

In equation (1), a variable Pc1 is the camera coordinates calculated immediately before the switching from the calculable state to the incalculable state, and a variable Pg1 is the gyro coordinates calculated immediately before the switching from the calculable state to the incalculable state. In this way, the gyro correction value Og is calculated as a difference value by subtracting the gyro coordinates from the camera coordinates immediately before the switching of the state.

After the switching from the calculable state to the incalculable state (state (c) in FIG. 6), the information processing system 1 corrects the gyro coordinates Pg by using the gyro correction value Og to calculate the control coordinates P. That is, the control coordinates P are calculated according to the following equation (2):

$$P = Pg + Og \tag{2}$$

As shown by equation (2), in the state (c), the control coordinates P are obtained by adding the gyro coordinates Pg and the gyro correction value Og.

As described above, according to the present embodiment, when the calculable state has switched to the incalculable state, the gyro correction value Og is calculated by using the camera coordinates Pc1 before the switching (equation (1)). After the switching, the control coordinate point P is calculated based on the gyro correction value Og and the gyro coordinates Pg (equation (2)). That is, in the above case, the control coordinates P are calculated based on the camera coordinates Pc1 before the switching and the gyro coordinates Pg after the switching, and the scroll process is performed by using the control coordinates P.

If it is assumed that after the calculable state has switched to the incalculable state, the gyro coordinates Pg are used directly as the control coordinates P, the control coordinates P might rapidly (discontinuously) change at the switching. This is because, as described above, even with the same attitude of the input device 2, the camera coordinates and the gyro coordinates are usually different values. If the control coordinates P rapidly change, scroll is rapidly performed and the screen changes discontinuously, and thus the operability of the scroll operation is deteriorated.

On the other hand, in the present embodiment, the camera coordinates (Pc1) before the switching from the calculable state to the incalculable state are reflected to the control coordinates after the switching. Thereby, the rapid change of the control coordinates before and after the switching is reduced, and the operability of the scroll operation can be enhanced.

In another embodiment, the information processing system 1 may use the gyro coordinates Pg directly as the control coordinates P after the switching from the calculable state to the incalculable state. Also in this case, as in the present embodiment, the scroll process is performed even when the camera coordinates are not calculated, and therefore, the user can perform the scroll operation by greatly changing the attitude of the input device 2 as described above.

Further, in the present embodiment, the information processing system 1 specifies the correction process for correcting the gyro coordinates (sets the gyro correction value Og based on equation (1)) so that the camera coordinates and the gyro coordinates immediately before the switching from the calculable state to the incalculable state are equal to each other. Then, the information processing system 1 performs the scroll process by using the control coordinates obtained by performing the correction process on the gyro coordinates after the switching to the incalculable state. Thus, the control coordinates can be changed seamlessly at the switching from the calculable state to the incalculable state, and thereby scroll is performed smoothly.

In another embodiment, after the switching from the calculable state to the incalculable state, the control coordinates P may be calculated so as to gradually change from the camera coordinates Pc1 immediately before the switching to the gyro coordinates Pg with time. Also in this case, rapid change of the control coordinates before and after the switching is reduced.

Further, in the present embodiment, the information processing system 1 performs, as the above-mentioned correction process, the process of calculating a difference value (gyro correction value) by subtracting the gyro coordinates from the camera coordinates immediately before the switching, and adding the difference value to the gyro coordinates after the switching (equation (2)). In another embodiment, the correction process may be a process of calculating a division value by dividing the camera coordinates immediately before the switching by the gyro coordinates, and multiplying the gyro coordinates after the switching by the division value. Also in this case, as in the present embodiment, the control coordinates can be changed seamlessly at the switching from the calculable state to the incalculable state, and scroll can be performed smoothly.

It is noted that an error might be accumulated on the gyro coordinates based on the gyro sensor 12, and the value of the gyro coordinates at the switching from the calculable state to the incalculable state might vary at each switching. Therefore, in the method of performing correction using the division value, the magnitude of the division value varies each time, and as a result, the ratio of the amount of change of the control coordinates to the amount of change of the attitude of the input device 2 (i.e., the amount of change of the gyro coordinates) in the incalculable state varies each time. The ratio that varies each time results in that the amount of scroll with the input device 2 being rotated by a predetermined angle varies each time, and thereby the operability of the scroll operation might be deteriorated. On the other hand, in the method of performing correction using the difference value as in the present embodiment, since the above-mentioned ratio does not vary, deterioration of operability due to variation in the ratio can be reduced.

Further, in the present embodiment, the imaging information for calculating the camera coordinates used for calculation of the difference value and the angular velocity information for calculating the gyro coordinates used for calculation of the difference value are obtained at the same timing by the information processing apparatus 3. That is, the imaging information and the angular velocity information are included in the same operation data and transmitted from the input device 2 to the information processing apparatus 3. Since the difference value is calculated by using the camera coordinates and the gyro coordinates based on the two pieces of information obtained at the same timing, the difference between the camera coordinates and the gyro coordinates can be calculated accurately, and the correction can be performed accurately. Thereby, scroll can be performed smoothly.

Next, with reference to FIG. 7, calculation of control coordinates in a case where the incalculable state switches to the calculable state will be described. After the state (c), when the attitude of the input device 2 changes and the incalculable state switches to the calculable state (state (d) in FIG. 7), the information processing system 1 sets a camera correction value Oc. The camera correction value Oc is a correction value used for correcting the control coordinates based on the camera coordinates Pc in the calculable state after switching from the incalculable state. In the present embodiment, the camera correction value Oc is calculated according to the following equation (3):

$$Oc = Pg2 + Og - Pc2 \quad (3)$$

In equation (3), a variable Pg2 is the gyro coordinates calculated immediately after the switching from the incalculable state to the calculable state, and a variable Pc2 is the camera coordinates calculated immediately after the switching from the incalculable state to the calculable state. In this way, the camera correction value Oc is calculated as a difference value by subtracting the camera coordinates Pc2 immediately after the switching from a value (Pg2+Og) obtained by correcting the gyro coordinates Pg2 immediately after the switching by using the gyro correction value Og. In other words, the camera correction value Oc is calculated as a difference value by subtracting the camera coordinates Pc2 immediately after the switching from the control coordinates P (=Pg2+Og) calculated in the same manner as before the switching of the state.

After the incalculable state has switched to the calculable state (state (e) in FIG. 7), the information processing system 1 calculates the control coordinates P by correcting the camera coordinates Pc by using the camera correction value Oc. That is, the control coordinates P are calculated according to the following equation (4):

$$P = Pc + Oc \quad (4)$$

As shown by equation (4), in the state (e), the control coordinates P are obtained by adding the camera coordinates Pc and the camera correction value Oc.

As described above, in the present embodiment, in the case where the incalculable state switches to the calculable state, the information processing system 1 does not use the correction value (gyro correction value) that was set when the calculable state switched to the incalculable state, but sets a new correction value (camera correction value). That is, in the above case, the control position is obtained by correcting the camera coordinates by using the value obtained by performing the correction process using the gyro correction value Og on the gyro coordinates (Pg2) immediately after the switching to the calculable state (equation (4)).

The attitude of the input device 2 at the switching from the calculable state to the incalculable state does not necessarily correspond to that at the switching from the incalculable state to the calculable state. Further, while the attitude of the input device 2 is changing in the incalculable state, an error may occur in the gyro coordinates obtained from the detection result of the gyro sensor 12. For these reasons, a difference between the camera coordinates and the gyro coordinates may vary between the switching from the calculable state to the incalculable state and the switching from the incalculable state to the calculable state. In the present embodiment, since a correction value is newly set, even in the above case, it is possible to reduce rapid change of the control coordinates at the switching from the incalculable state to the calculable state.

In another embodiment, a correction value (camera correction value) need not be set when the incalculable state switches to the calculable state. In this case, after the switching to the calculable state, as in the above state (a), the camera coordinates may be used directly as the control coordinates. If the error accumulated in the gyro coordinates during the incalculable state is not great, the operability of the scroll operation is not significantly deteriorated even if the camera correction value is not set.

Further, in another embodiment, also when the incalculable state switches to the calculable state, correction may be performed by the above-mentioned method using the division value, as in the case where the calculable state switches to the incalculable state.

When the calculable state (state (e)) further switches to the incalculable state, a gyro correction value Og is set again. In this case, the gyro correction value Og is calculated based on the following equation (5):

$$Og = Pc3 + Oc - Pg3 \quad (5)$$

In equation (5), a variable Pc3 is camera coordinates calculated immediately before the switching from the calculable state to the incalculable state, and a variable Pg3 is camera coordinates calculated immediately before the switching from the calculable state to the incalculable state. Thus, the gyro correction value Og is calculated as a difference value by subtracting the gyro coordinates (Pg1 or Pg3) immediately before the switching from the control coordinates P (P=Pc1 in the state (a), or P=Pc3+Oc in the state of (e)) calculated similarly to before the switching. In this way, in the present embodiment, after the state (e), a correction value (a gyro correction value or a camera correction value) is newly set in accordance with the switching between the calculable state and the incalculable state, and the control coordinates are calculated by using the newly set correction value.

In the present embodiment, the information processing system 1 resets the correction values (the gyro correction value and the camera correction value) when the scroll operation is ended. That is, at the time of starting the scroll process, the amount of correction by the correction process is set to 0. When the correction process is performed, an error occurs between the control coordinates and the camera coordinates. If the scroll process is performed for a long time and the correction is repeatedly performed, the error might be accumulated to increase the amount of error. Since the camera coordinates indicate the above-mentioned pointing position (or a position in the vicinity of the pointing position), if the error between the control coordinates and the camera coordinates used for the process increases, the user might have a sense of discomfort with the operation. On the other hand, in the present embodiment, since the correction values (i.e., the error between the control coordinates and the camera coordinates) are reset at the time of starting the scroll process, it is possible to reduce the possibility of causing the user to have a sense of discomfort due to the error between the control coordinates and the camera coordinates. It is noted that in the present embodiment, the correction values are reset at the timing when the scroll process is ended, but the reset of the correction values may be performed at any timing before the next scroll process is started.

As described above, according to the present embodiment, the camera coordinates are calculated by using the imaging information, and the gyro coordinates are calculated by using the angular velocity information. Then, when the camera coordinates are calculable, the information processing system 1 performs predetermined information processing (scroll process) by using the control coordinates based on at least the camera coordinates. When the camera coordinates are incalculable, the information processing system 1 performs the predetermined information processing by using the control coordinates based on at least the gyro coordinates. Therefore, according to the present embodiment, since the information processing is performed even when the camera coordinates are not calculated, the range in which the input device 2 can be moved is increased, and thus the user can perform the input operation by freely moving the input device 2.

Further, in the present embodiment, the information processing system 1 performs the process (scroll process) of moving an image displayed on the television 4 in accordance with the attitude of the input device 2, by using the imaging information obtained by the camera 11. Then, when the calculable state has switched to the incalculable state, the information processing system 1 continues the movement of the image by using the detection result (gyro coordinates) of the gyro sensor 12. Therefore, according to the present embodiment, even when the process of moving the image by using the imaging information cannot be performed, the process of moving the image can be continuously performed. Thereby, the user can perform the operation of moving the image by freely moving the input device 2.

Further, in the present embodiment, the scroll process using the control coordinates based on the gyro coordinates is started when the calculable state has switched to the incalculable state after the start of the scroll process. Therefore, in the calculable state, the control coordinates can be accurately calculated by using the camera coordinates, and even after the calculable state has switched to the incalculable state, the scroll process can be continuously performed by using the control coordinates calculated based on the gyro coordinates.

(2-5: Display of Pointer)

Hereinafter, a method of displaying a pointer will be described. First, during the pointer operation, the information processing system 1 displays the pointer at a position indicated by the control coordinates. During the pointer operation, a user seems to use the input device 2 with the input device 2 facing the television 4 (marker device 5). Therefore, the information processing system 1 is in the calculable state in most cases, and as a result, the pointer is displayed at the position indicated by the camera coordinates. However, if the camera coordinates are not calculated due to some causes even when the input device 2 faces the television 4 (marker device 5), the control coordinates based on the gyro coordinates are calculated, and the pointer is displayed at the position of the control coordinates.

Next, a method of displaying a pointer during the scroll operation will be described. First, in the calculable state (above state (a)) at the time of starting the scroll operation, the information processing system 1 displays the pointer at a position indicated by the control coordinates. In this state, since the control coordinates coincide with the camera coordinates, if the scroll operation is ended at this time point and the pointer operation is started, the pointer remains displayed at the same position. It is noted that in the incalculable state, the control coordinates indicate a position outside the screen of the television 4, and therefore, no pointer is displayed on the screen.

Figure 8:
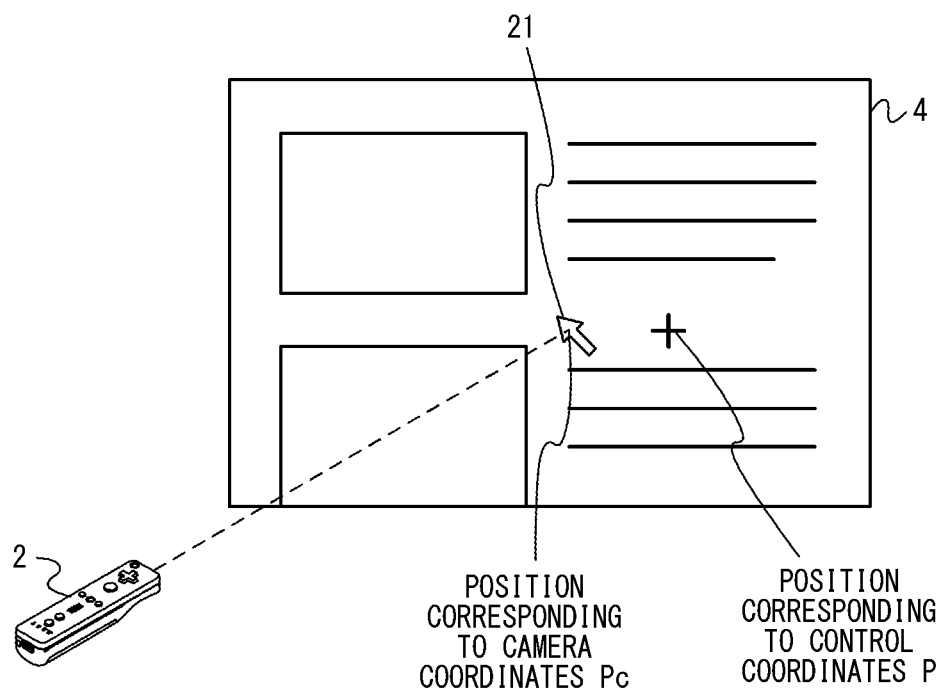
FIG. 8 is a diagram showing an example of a case where a pointer is displayed on a screen in a calculable state switched from an incalculable state.

Further, in the calculable state (above state (e)) switched from the incalculable state, the information processing system 1 displays a pointer at a position corresponding to the camera coordinates. FIG. 8 is a diagram showing an exemplary case wherein a pointer is displayed on the screen in the calculable state switched from the incalculable state. In this state, since the camera coordinates are corrected by the camera correction value, the control coordinates and the camera coordinates are different from each other. As shown in FIG. 8, the pointer is displayed at the position of the camera coordinates. Accordingly, if the scroll operation is ended at this time point and the pointer operation is started, the pointer remains displayed at the same position. Therefore, when the scroll operation shifts to the pointer operation, the display position of the pointer does not change rapidly. Therefore, the shift from the scroll operation to the pointer operation can be smoothly performed without causing the user to have a sense of discomfort.

In another embodiment, the information processing system 1 may display the pointer at the position indicated by the control coordinates, in the calculable state (above state (e)) switched from the incalculable state. In this case, when the scroll operation is ended at this time point and the pointer operation is started, the pointer rapidly moves from the position of the control coordinates to the position of the camera coordinates. However, since the pointer is displayed at the position of the camera coordinates during the pointer operation, the operability of the pointer operation is not deteriorated, thereby providing the pointer operation with excellent operability as in the present embodiment.

As described above, according to the present embodiment, when the scroll process is not performed, the pointer process is performed in which the pointer for designating an selectable object displayed on the television 4 is displayed in the position corresponding to the control coordinates. Therefore, not only the operation of scrolling the image but also the pointer operation can be performed by using the input device 2. Further, since both the scroll operation and the pointer operation are performed using the control coordinates, the user can easily perform these two operations with the same operation feeling. In another embodiment, the information processing system 1 may perform only the scroll process, and may not perform the pointer process.

[3. Specific Example of Display Control Process]

Figure 9:
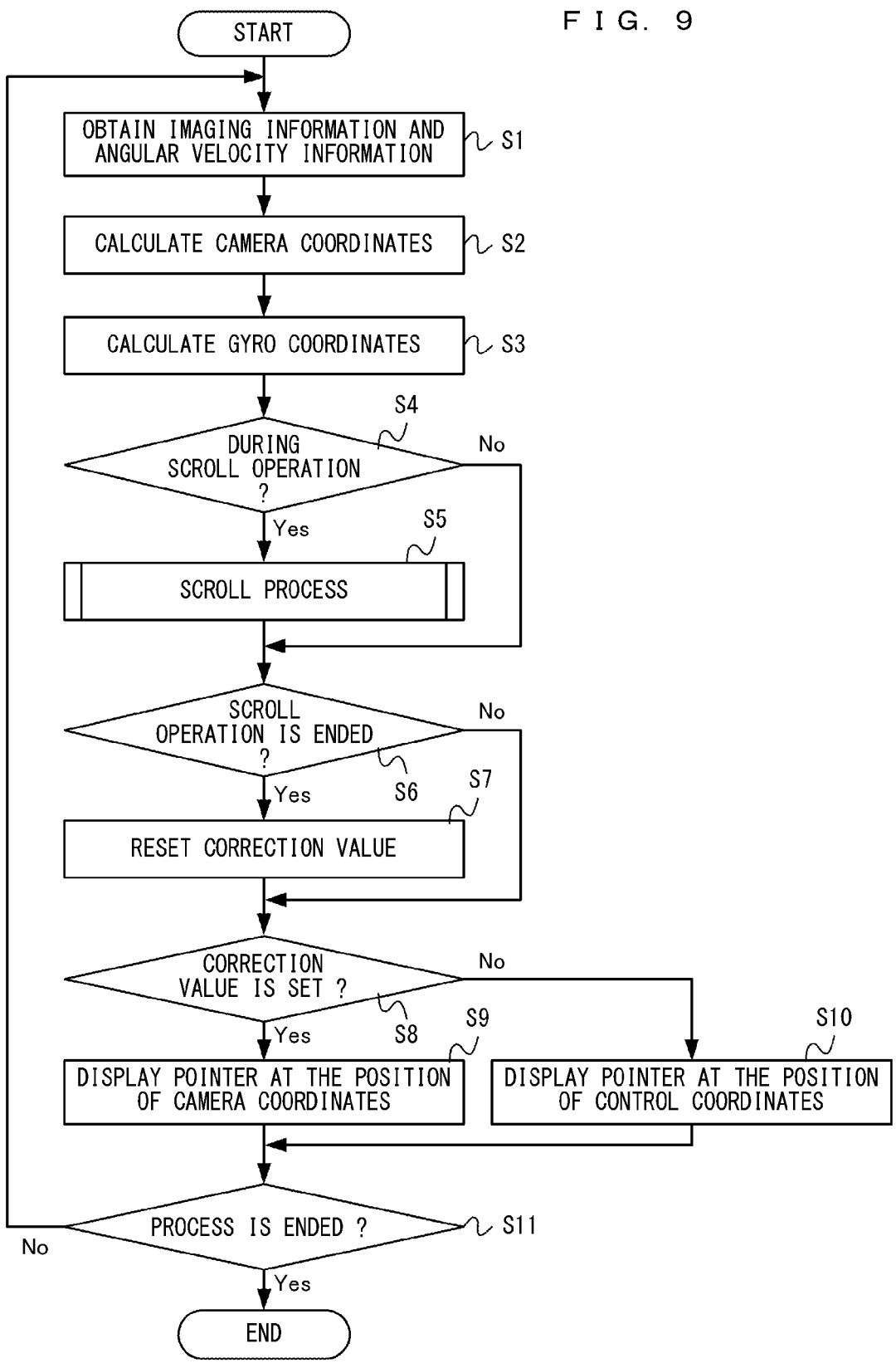
FIG. 9 is a flowchart showing an example of a flow of a display control process performed by an information processing apparatus according to the embodiment.

Hereinafter, a specific example of a display control process performed by the information processing system 1 (information processing apparatus 3) of the present embodiment will be described. FIG. 9 is a flowchart showing an example of a flow of the display control process performed by the information processing apparatus 3 (CPU 14) in the present embodiment. In the present embodiment, a series of processes shown in FIG. 9 are performed by the CPU 14 executing an information processing program stored in the program storage section 16.

The timing at which the display control process shown in FIG. 9 is started is arbitrary. In the present embodiment, the information processing program is configured as a part of a browser program that enables a user to browse a web page. In this case, the display control process shown in FIG. 9 is started when the user has performed an instruction to start the browser program. In addition, a part or the entirety of the information processing program (browser program) is loaded into the memory 12 at appropriate timing, and executed by the CPU 14. Thereby, the series of processes shown in FIG. 9 is started. It is noted that the information processing program has been previously stored in the program storage section 16 in the information processing apparatus 3. However, in another embodiment, the information processing program may be obtained by the information processing apparatus 3 from an attachable/detachable storage medium and stored into the memory 15, or may be obtained from another apparatus via a network such as the Internet and stored into the memory 15.

It is noted that a process in each step in the flowchart shown in FIG. 9 is merely an example, and as long as the same result is obtained, the order of the processes in the respective steps may be changed, or another process may be performed in addition to (or instead of) the process in each step. In addition, in the present embodiment, the CPU performs the process in each step in the flowchart. However, a processor or a dedicated circuit other than the CPU may perform the processes at some of the steps in the flowchart.

In the display control process, first, in step S1, the CPU 14 obtains the imaging information and the angular velocity information. That is, the CPU 14 receives the operation data including the imaging information and the angular velocity information from the input device 2, and stores the received operation data into the memory 15. It is noted that the operation data includes the above-mentioned depression information.

In step S2, the CPU 14 calculates camera coordinates based on the imaging information. In the present embodiment, the camera coordinates are calculated according to the method described in the above section entitled (2-2: Calculation of camera coordinates and gyro coordinates). The CPU 14 stores data indicating the calculated camera coordinates into the memory 15.

In step S3, the CPU 14 calculates gyro coordinates based on the angular velocity information. In the present embodiment, the gyro coordinates are calculated according to the method described in the above section entitled (2-2: Calculation of camera coordinates and gyro coordinates). The CPU 14 stores data indicating the calculated gyro coordinates into the memory 15.

In step S4, the CPU 14 determines whether the scroll operation is being performed. That is, the CPU 14 determines whether the above-mentioned predetermined button is pressed, with reference to the depression information obtained in step S1 and included in the operation data stored in the memory 15. When the result of the determination in step S4 is positive, a process in step S5 is performed. On the other hand, when the result of the determination in step S4 is negative, the process in step S5 is skipped and a process in step S6 is performed.

In step S5, the CPU 14 performs a scroll process. The scroll process is a process of scrolling an image (an image of a web page) displayed on the television 4, based on a control position. Hereinafter, the scroll process will be described in detail with reference to FIG. 10.

Figure 10:
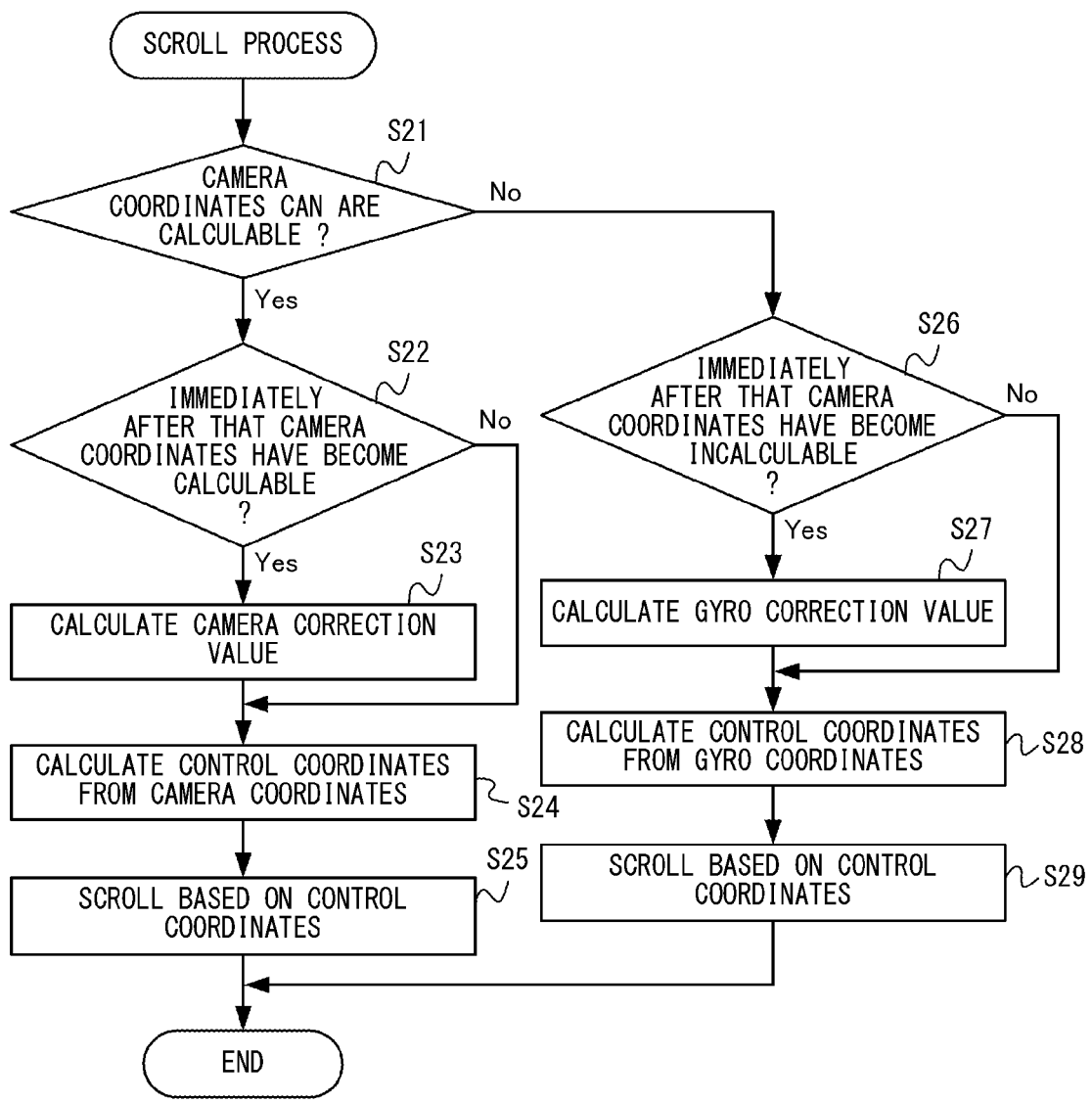
FIG. 10 is a flowchart showing, in detail, an example of a flow of a scroll process (step S5) shown in FIG. 9.

FIG. 10 is a flowchart showing an example of a specific flow of the scroll process (step S5) shown in FIG. 9. In the scroll process, first, in step S21, the CPU 14 determines whether camera coordinates can be calculated, that is, whether the information processing system 1 is in the calculable state. The CPU 14 can perform this determination in step S21 by referring to the imaging information obtained in step S1 and included in the operation data stored in the memory 15. When the result of the determination in step S21 is positive, a process in step S22 is performed. On the other hand, when the result of the determination in step S21 is negative, a process in step S26 described later is performed.

In step S22, the CPU 14 determines whether the current time is immediately after the calculable state has occurred. This determination in step S22 can be performed by using the imaging information obtained in the immediately previous process loop (the process loop of steps S1 to S11), and the imaging information obtained in the current process loop. When the result of the determination in step S22 is positive, a process in step S23 is performed. On the other hand, when the result of the determination in step S22 is negative, the process in step S23 is skipped and a process in step S24 is performed.

In step S23, the CPU 14 calculates a camera correction value. In the present embodiment, the camera correction value is calculated according to equation (3) described in the above section entitled (2-4: Calculation of control coordinates). The CPU 14 reads, from the memory 15, the data of the camera coordinates and gyro coordinates and the data of the gyro correction value, which have been calculated in the current process loop, and calculates the camera correction value. The CPU 14 stores data of the calculated camera correction value into the memory 15.

In step S24, the CPU 14 calculates control coordinates by using the camera coordinates. In the process in step S24, if a camera correction is not set, the camera coordinates are used directly as the control coordinates. On the other hand, if a camera correction value is set, the control coordinates are calculated according to equation (4) described in the above section entitled (2-4: Calculation of control coordinates). The CPU 14 reads the data of the camera coordinates (and the data of the camera correction value according to need) from the memory 15, and calculates the control coordinates by using the read data. The CPU 14 stores data of the calculated control coordinates in the memory 15.

In step S25, the CPU 14 scrolls the image displayed on the television 4, based on the control coordinates. The scroll of the image is performed according to the method described in the above section entitled (2-3: Content of display control operation). The CPU 14 reads the data of the control coordinates from the memory 15, and determines, based on the control coordinates, the position of a display area of the web page, to be displayed on the screen of the television 4. Further, the CPU 14 causes the television 4 to display the image of the determined display area. After step S25, the CPU 14 ends the scroll process.

On the other hand, in step S26, the CPU 14 determines whether the current time is immediately after the incalculable state has occurred. Like step S22, the determination in step S26 can be performed by using the imaging information obtained in the immediately previous process loop and the imaging information obtained in the current process loop. When the result of the determination in step S26 is positive, a process in step S27 is performed. On the other hand, when the result of the determination in step S26 is negative, the process in step S27 is skipped and a process in step S28 is performed.

In step S27, the CPU 14 calculates a gyro correction value. In the present embodiment, the gyro correction value is calculated according to equation (1) or (5) described in the above section entitled (2-4: Calculation of control coordinates). The CPU 14 reads, from the memory 15, the data of the camera coordinates and gyro coordinates calculated in the immediately previous process loop, and the data of the camera correction value according to need, and calculates the gyro correction value. The CPU 14 stores data of the calculated gyro correction value into the memory 15.

In step S28, the CPU 14 calculates control coordinates by using the gyro coordinates. If a gyro correction value is set, the control coordinates are calculated according to equation (2) described in the above section entitled (2-4: Calculation of control coordinates). On the other hand, if a gyro correction value is not set (e.g., if the scroll operation has been started in the incalculable state), the gyro coordinates are used directly as the control coordinates. The CPU 14 reads the data of the gyro coordinates (and the data of the gyro correction value according to need) from the memory 15, and calculates the control coordinates by using the read data. The CPU 14 stores data of the calculated control coordinates into the memory 15.

In step S29, the CPU 14 scrolls the image displayed on the television 4, based on the control coordinates. The process in step S29 is identical to the process in step S25. After step S29, the CPU 14 ends the scroll process.

Referring back to FIG. 9, in step S6, the CPU 14 determines whether the scroll operation has been ended. That is, the CPU 14 reads, from the memory 15, the operation data including the depression information, which have been obtained in the immediately-previous process loop and the current process loop, and determines whether the state where the predetermined button is pressed has switched to the state where the predetermined button is not pressed. When the result of the determination in step S6 is positive, a process in step S7 is performed. On the other hand, when the result of the determination in step S6 is negative, the process in step S7 is skipped and a process of step S8 is performed.

In step S7, the CPU 14 resets the correction values. That is, the CPU 14 deletes the data of the gyro correction value and camera correction value stored in the memory 15.

In step S8, the CPU 14 determines whether a correction value is set. That is, the CPU 14 determines whether the correction value (camera correction value) is stored in the memory 15. In the present embodiment, the case where the correction value is set is a case where the scroll operation is being performed and switching between the calculable state and the incalculable state occurs. On the other hand, the case where the correction value is not set is a case where the pointer operation is being performed or a case where switching between the calculable state and the incalculable state does not occur (state (a)). The determination process in step S8 is a process for determining whether the pointer is to be displayed at a position corresponding to the camera coordinates or at a position corresponding to the control coordinates. When the result of the determination in step S8 is positive, a process in step S9 is performed. On the other hand, when the result of the determination in step S8 is negative, a process in step S10 is performed.

In step S9, the CPU 14 displays the pointer at the position of the camera coordinates. That is, the CPU 14 generates an image in which an image of the pointer is superimposed on the image of the web page at the position of the camera coordinates, and causes the television 4 to display the image.

On the other hand, in step S10, the CPU 14 displays the pointer at a position of the control coordinates. That is, the CPU 14 generates an image in which an image of the pointer is superimposed on the image of the web page at the position of the control coordinates, and causes the television 4 to display the image.

In the processes in steps S9 and S10, if, on the plane of the control coordinates, the position of the pointer is outside the area (the dotted-line area 20 shown in FIG. 3) corresponding to the screen of the television 4, the pointer is not displayed. In another embodiment, in the above-mentioned case, the CPU 14 may display an image of a semi-transparent pointer at a position on an edge of the screen and corresponding to the control coordinates (or camera coordinates). For example, the image of the semi-transparent pointer may be displayed at a position near an intersection between a straight line extending from the center of the screen to the control coordinates and the periphery of the screen.

In step S11, the CPU 14 determines whether the display control process is to be ended. A specific method for this determination is arbitrary. For example, when a user has performed an instruction to end execution of the browser, the CPU 14 determines to end the display control process. When there is no such instruction from the user, the CPU 14 determines not to end the display control process. When the result of the determination in step S11 is negative, the process in step S1 is performed again. Thereafter, the processes in steps S1 to S11 are repeated until the CPU 14 determines to end the display control process in step S11. On the other hand, when the result of the determination in step S11 is positive, the CPU 14 ends the display control process shown in FIG. 9.

It is noted that in the above-mentioned display control process, if a selectable object included in the web page displayed on the television 4 is selected by the pointer, the CPU 14 may perform a process corresponding to the selected object.

[4. Modifications]

(Modification Relating to a Value Calculated According to the Attitude of the Input Device 2)

In the above-mentioned embodiment, the information processing system 1 calculates the coordinates (camera coordinates, gyro coordinates, and control coordinates) each indicating a position on a predetermined plane (xy plane shown in FIG. 3), as a value according to the attitude of the input device 2. In another embodiment, the information processing system 1 may calculates a value (i.e., a scalar value) indicating a position on a predetermined straight line, as a value according to the attitude of the input device 2. For example, if an image is to be scrolled only in the up-down direction, the information processing system 1 may calculate a scalar value according to the attitude relating to the pitch direction of the input device 2, and may perform the scroll process by using the scalar value.

(Modification Relating to Information Processing Performed by Using Control Coordinates)

In the above-mentioned embodiment, as an example of the information processing performed by using the value (control coordinates) according to the attitude of the input device 2, the process of scrolling an image displayed on the display device has been described. However, the content of the information processing performed by using the value according to the attitude of the input device 2 is arbitrary. For example, in another embodiment, the information processing may be a process of moving an image (object) displayed on the display device. Further, for example, the information processing may be a process of distinguishing a gesture input based on a trajectory composed of control coordinates, and performing a process corresponding to the gesture.

(Modification Relating to Calculation of Control Coordinates)

In the above-mentioned embodiment, the control coordinates are calculated based on the camera coordinates obtained from the imaging information and the gyro coordinates obtained from the angular velocity information. In another embodiment, the control coordinates may be calculated by an arbitrary method using the imaging information and the detection result of the attitude sensor (in the above embodiment, the angular velocity information). For example, in the modification of the above embodiment, the control coordinates to be used for the above information processing may be calculated as follows.

In the modification of the above embodiment, as in the above embodiment, the information processing system 1 calculates the camera coordinates directly as the control coordinates in the calculable state. Further, when the calculable state has switched to the incalculable state, the information processing system 1 may move the control coordinates (camera coordinates) immediately before the switching, by using the angular velocity information obtained after the switching, thereby to calculate the control coordinates (after the switching). Specifically, when the calculable state has switched to the incalculable state, the control coordinates may be calculated by moving the immediately previous control coordinates by an amount of movement corresponding to the magnitude of the angular velocity indicated by the angular velocity information, in the movement direction corresponding to the direction of the angular velocity.

In the above modification, the camera coordinates may be always calculated as the control coordinates in the calculable state (even after the switching from the incalculable state to the calculable state). Further, after the switching from the incalculable state to the calculable state, as in the above embodiment, the information processing (scroll process) may be performed by using the angular velocity information obtained immediately after the switching, and the imaging information obtained after the switching.

As in the above modification, the information processing system 1 is not limited to such a configuration that performs information processing by using two types of coordinates (camera coordinates and gyro coordinates) on a plane, but may be configured to perform information processing by an arbitrary method using the imaging information and the detection result of the attitude sensor (in the above embodiment, the angular velocity information). Also in the above modification, as in the above embodiment, if the information processing system 1 is in the calculable state at the time of starting the information processing (scroll process), the information processing is performed by using the imaging information, and when the calculable state has switched to the incalculable state, information to be used is switched from the imaging information to the angular velocity information, thereby to perform the information processing. Therefore, even when the imaging information cannot be used, the information processing is performed. Thereby, the range in which the input device 2 can be moved is increased, and thus the user can perform an input operation by freely moving the input device 2.

(Modification Relating to Arrangement of Camera and Marker Device)

In the above embodiment, the input device 2 held by a user is provided with the camera 11, and the marker device 5 is arranged on the periphery of the television 4. In another embodiment, an input device may be provided with a marker device, and a camera may be arranged on the periphery of a television. Also in this structure, as in the above embodiment, the information processing apparatus can calculate the positional relation of the input device with respect to the camera by using imaging information based on an image captured by the camera, and perform information processing (e.g., the scroll process in the above embodiment) by using the imaging information. Further, also in this structure, as in the above embodiment, if the marker device is outside the imaging range of the camera, the information processing is performed by using the detection result of the gyro sensor provided in the input device, and thereby the information processing can be continued. That is, after the marker device has been outside the imaging range of the camera, the user can continue the information processing by moving the input device.

For the purpose of: performing an input operation by freely moving an input member; and the like, it is possible use the above embodiment for, for example, an information processing apparatus, an information processing system, an information processing program, and the like for displaying an image on a display device.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing apparatus comprising at least a computer processor and which performs predetermined information processing in accordance with an attitude of an input member having an imaging device and an attitude sensor, the information processing apparatus being configured to at least perform:
   a first position calculation configured to calculate a first position according to the attitude of the input member, which position is on a predetermined straight line or a predetermined plane, by using imaging information based on an image including a predetermined imaging target captured by the imaging device;
   a second position calculation configured to calculate a second position according to the attitude of the input member, which position is on a predetermined straight line or a predetermined plane, by using a result of detection of the attitude sensor; and
   a processing execution configured to:
      calculate a control position based on at least the first position, and perform a scroll process of scrolling an image displayed on the display device, by using the control position based on at least the first position, when the first position is calculable, and
      calculate a control position based on at least the second position, and perform the scroll process by using the control position based on at least the second position, when the first position is incalculable, and
   wherein when a state where the first position is calculable has switched to a state where the first position is incalculable, the processing execution specifies a correction process for correcting the second position using the values of the first position and the second position immediately before the switching.

2. The information processing apparatus according to claim 1, wherein
   after the scroll process has been started, the processing execution starts the scroll process by using the control position based on the second position, when the state where the first position is calculable has switched to the state where the first position is incalculable.

3. The information processing apparatus according to claim 1, wherein
the processing execution performs, as the scroll process, a process of moving a target image displayed on the display device in accordance with the attitude of the input member, and
when the state where the first position is calculable has switched to the state where the first position is incalculable, the processing execution continues the movement of the target image by using the control position based on the second position.

4. The information processing apparatus according to claim 1, wherein
when the state where the first position is calculable has switched to the state where the first position is incalculable, the processing execution performs the scroll process by using a control position based on the first position before the switching and the second position after the switching.

5. The information processing apparatus according to claim 1, further comprising:
a third pointer processing configured to display a pointer image for designating a selectable object displayed on the display device, at a position corresponding to the control position, when the scroll process is not performed.

6. An information processing apparatus comprising at least a computer processor and which performs predetermined information processing in accordance with an attitude of an input member having an imaging device and an attitude sensor, the information processing apparatus being configured to at least perform:
a first position calculation configured to calculate a first position according to the attitude of the input member, which position is on a predetermined straight line or a predetermined plane, by using imaging information based on an image including a predetermined imaging target captured by the imaging device;
a second position calculation configured to calculate a second position according to the attitude of the input member, which position is on a predetermined straight line or a predetermined plane, by using a result of detection of the attitude sensor; and
a processing execution configured to:
calculate a control position based on at least the first position, and perform a scroll process of scrolling an image displayed on the display device, by using the control position based on at least the first position, when the first position is calculable, and
calculate a control position based on at least the second position, and perform the scroll process by using the control position based on at least the second position, when the first position is incalculable;
wherein when the state where the first position is calculable has switched to the state where the first position is incalculable, the processing execution performs the scroll process by using a control position based on the first position before the switching and the second position after the switching; and
wherein when the state where the first position is calculable has switched to the state where the first position is incalculable, the processing execution specifies a correction process for correcting the second position so that the values of the first position and the second position immediately before the switching are equal to each other, and performs the scroll process by using a control position obtained by performing the correction process on the second position after the switching.

7. The information processing apparatus according to claim 6, wherein
when the state where the first position is calculable has switched to the state where the first position is incalculable, the processing execution calculates a difference value by subtracting the second position immediately before the switching from the first position immediately before the switching, and performs the scroll process by using a control position obtained by adding the difference value to the second position after the switching.

8. The information processing apparatus according to claim 7, wherein
the imaging information for calculating the first position used for calculation of the difference value, and the detection result of the attitude sensor, for calculating the second position used for calculation of the difference value, are obtained at the same timing by the information processing apparatus.

9. The information processing apparatus according to claim 6, wherein
after the switching from the state where the first position is calculable to the state where the first position is incalculable, when further switching to the state where the first position is calculable has occurred, the processing execution performs the scroll process by using a control position which is obtained by correcting the first position by using a value obtained by performing the correction process on the second position immediately after the switching to the state where the first position is calculable.

10. The information processing apparatus according to claim 9, further comprising:
a first pointer processing configured to display a pointer image at a position corresponding to the first position, when further switching to the state where the first position is calculable has occurred after the switching from the state where the first position is calculable to the state where the first position is incalculable.

11. The information processing apparatus according to claim 9, further comprising:
a second pointer processing configured to display a pointer image at a position corresponding to the control position, when further switching to the state where the first position is calculable has occurred after the switching from the state where the first position is calculable to the state where the first position is incalculable.

12. The information processing apparatus according to claim 6, wherein
the processing execution performs the scroll process while a predetermined condition is satisfied, and sets the amount of correction by the correction process to 0 at the time of starting the scroll process.

13. A non-transitory and computer-readable storage medium having stored thereon an information processing program executed on a computer of an information processing apparatus which performs predetermined information processing in accordance with an attitude of an input member having an imaging device and an attitude sensor,
the information processing program causing the computer to execute:
calculating a first position according to the attitude of the input member, which position is on a predetermined straight line or a predetermined plane, by using imaging information based on an image including a predetermined imaging target captured by the imaging device;

calculating a second position according to the attitude of the input member, which position is on a predetermined straight line or a predetermined plane, by using a result of detection of the attitude sensor;

calculating a control position based on at least the first position, and performing a scroll process of scrolling an image displayed on the display device by using the control position based on at least the first position, when the first position is calculable;

calculating a control position based on at least the second position, and performing the scroll process by using the control position based on at least the second position, when the first position is incalculable; and when a state where the first position is calculable has switched to a state where the first position is incalculable, specifying a correction process for correcting the second position using the values of the first position and the second position immediately before the switching.

14. An information processing system which performs a predetermined information processing in accordance with an attitude of an input member having an imaging device and an attitude sensor, the information processing system comprising:

a first position calculator configured to calculate a first position according to the attitude of the input member, which position is on a predetermined straight line or a predetermined plane, by using imaging information based on an image including a predetermined imaging target captured by the imaging device;

a second position calculator configured to calculate a second position according to the attitude of the input member, which position is on a predetermined straight line or a predetermined plane, by using a result of detection of the attitude sensor; and a processing execution device configured to:
  calculate a control position based on at least the first position, and perform the predetermined information processing by using the control position based on at least the first position, when the first position is calculable;
  calculate a control position based on at least the second position, and perform the predetermined information processing by using the control position based on at least the second position, when the first position is incalculable; and
  when a state where the first position is calculable has switched to a state where the first position is incalculable, specify a correction process for correcting the second position using the values of the first position and the second position immediately before the switching.

15. A method for performing predetermined information processing in accordance with an attitude of an input device having an imaging device and an attitude sensor, the method comprising:

calculating a first position according to the attitude of the input member, which position is on a predetermined straight line or a predetermined plane, by using imaging information based on an image including a predetermined imaging target captured by the imaging device;

calculating a second position according to the attitude of the input member, which position is on a predetermined straight line or a predetermined plane, by using a result of detection of the attitude sensor;

calculating a control position based on at least the first position, and performing, using a computer processor, the predetermined information processing by using the control position based on at least the first position, when the first position is calculable;

calculating a control position based on at least the second position, and performing the predetermined information processing by using the control position based on at least the second position, when the first position is incalculable; and when a state where the first position is calculable has switched to a state where the first position is incalculable, specifying a correction process for correcting the second position using the values of the first position and the second position immediately before the switching.

* * * * *